US010627786B2

(12) United States Patent
Salsbury et al.

(10) Patent No.: US 10,627,786 B2
(45) Date of Patent: Apr. 21, 2020

(54) EXTREMUM-SEEKING CONTROL SYSTEM WITH CONSTRAINT HANDLING

(71) Applicant: Johnson Controls Technology Company, Auburn Hills, MI (US)

(72) Inventors: Timothy I. Salsbury, Mequon, WI (US); John M. House, Saint-Leonard (CA)

(73) Assignee: Johnson Controls Technology Company, Auburn Hills, MI (US)

( * ) Notice: Subject to any disclaimer, the term of this patent is extended or adjusted under 35 U.S.C. 154(b) by 36 days.

(21) Appl. No.: 15/950,009

(22) Filed: Apr. 10, 2018

(65) Prior Publication Data

US 2018/0299839 A1 Oct. 18, 2018

Related U.S. Application Data

(60) Provisional application No. 62/484,681, filed on Apr. 12, 2017.

(51) Int. Cl.
*G05B 13/02* (2006.01)
*F24F 11/62* (2018.01)

(52) U.S. Cl.
CPC ......... *G05B 13/021* (2013.01); *G05B 13/022* (2013.01); *G05B 13/0255* (2013.01); *F24F 11/62* (2018.01)

(58) Field of Classification Search
CPC .................................................... G05B 15/02
USPC ........................................................ 700/34
See application file for complete search history.

(56) References Cited

U.S. PATENT DOCUMENTS 8,200,344 B2 * 6/2012 Li ........................ F24F 11/006
                                                          700/275
8,200,345 B2 * 6/2012 Li ............................ G05B 5/01
                                                           700/38
8,666,517 B2 * 3/2014 Li ............................ G05B 5/01
                                                           700/38

(Continued)

OTHER PUBLICATIONS

Mario A. Rotea, Analysis of Multivariable Extremum Seeking Algorithms, Jun. 2000, Proceeding of the American Control Conference, pp. 5 (Year: 2000).*

(Continued)

*Primary Examiner* — Suresh Suryawanshi
(74) *Attorney, Agent, or Firm* — Foley & Lardner LLP

(57) ABSTRACT

An extremum-seeking control system includes a plant operable to affect a variable state or condition of a building and an extremum-seeking controller. The extremum-seeking controller is configured to provide a control input to a plant and receive a performance variable as a first feedback from the plant. The plant uses the control input to affect the performance variable. The extremum-seeking controller is configured to receive a constrained variable as a second feedback from the plant and calculate a performance penalty by applying a penalty function to the constrained variable. The extremum-seeking controller is further configured to modify the performance variable with the performance penalty to generate a modified cost function, estimate a gradient of the modified cost function with respect to the control input, and drive the gradient of the modified cost function toward zero by modulating the control input.

20 Claims, 11 Drawing Sheets

(56) References Cited

U.S. PATENT DOCUMENTS

| | | | | |
|---|---|---|---|---|
| 2013/0300115 | A1* | 11/2013 | Seem | H02P 9/04 |
| | | | | 290/44 |
| 2017/0002641 | A1* | 1/2017 | Dykstra | E21B 44/00 |
| 2017/0176954 | A1* | 6/2017 | Salsbury | G05B 13/022 |
| 2017/0241657 | A1* | 8/2017 | Salsbury | F24F 11/30 |
| 2017/0241658 | A1* | 8/2017 | Salsbury | F24F 5/0035 |
| 2018/0238169 | A1* | 8/2018 | Sun | E21B 43/26 |

OTHER PUBLICATIONS

Miroslav Krstic, Extremum Seeking Control for Discrete-Time Systems, 2002, University of California, pp. 8 (Year: 2002).*
Li et al, Extremum Seeking Control of a Tunable Thermoacoustic Cooler, Jul. 2005, IEEE, pp. 10 (Year: 2005).*
Wang et al, Extremum Seeking for Limit Cycle Minimization, 2000, IEEE, pp. 6 (Year: 2000).*
Stefan Larson, Literature Study for Extremum Control, Nov. 1, 2001, Chalmers University of Technology, pp. 14 (Year: 2001).*
Dehann et al., Extremum-seeking control of state-constrained non-linear systems, Department of Chemical Engineering, Science Direct, vol. 41, No. 9, Sep. 1, 2005, pp. 1567-1574.
Dong Liujia et al., Constraint Handling in ESC Control Strategies with Application to HVAC Systems, 2018 Annual American Control Conference, Jun. 27-29, 2018, pp. 565-570.
Extended European Search Report, EP App. No. 18 166 329.5, dated Sep. 26, 2018. 7 pages.
Mu Baojie et al., Optimization and Sequencing of Chilled-water Plant Based on Extremum Seeking Control, 2016 American Control Conference, Jul. 6, 2016, pp. 2373-2378.

* cited by examiner

EXTREMUM-SEEKING CONTROL SYSTEM WITH CONSTRAINT HANDLING

CROSS REFERENCE TO RELATED PATENT APPLICATION

This application claims the benefit of a priority to U.S. Provisional Patent Application No. 62/484,681, filed Apr. 12, 2017, the entire disclosure of which is incorporated by reference herein.

BACKGROUND

The present disclosure relates generally to an extremum-seeking control (ESC) system. ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. Optimization of system performance can be obtained by driving the gradient towards zero by using a negative feedback loop in the closed-loop system. ESC is a non-model based control strategy, meaning that a model for the controlled system is not necessary for ESC to optimize the system.

ESC typically involves online estimation of a property related to the gradient of a cost function relative to a manipulated variable. The manipulated variable can be continuously adjusted in order to move to a point where this gradient measure is zero. It is straightforward to apply constraints to the variable being manipulated by using upper and lower bounds. However, it may be desirable to also constrain other variables that are affected by the operation of ESC within certain bounds. The problem of applying constraints to other variables affected by ESC can be difficult to handle within the ESC framework.

SUMMARY

One implementation of the present disclosure is an extremum-seeking control system including a plant operable to affect a variable state or condition of a building and an extremum-seeking controller. The extremum-seeking controller is configured to provide a control input to a plant and receive a performance variable as a first feedback from the plant. The plant uses the control input to affect the performance variable. The extremum-seeking controller is configured to receive a constrained variable as a second feedback from the plant and calculate a performance penalty by applying a penalty function to the constrained variable. The extremum-seeking controller is further configured to modify the performance variable with the performance penalty to generate a modified cost function, estimate a gradient of the modified cost function with respect to the control input, and drive the gradient of the modified cost function toward zero by modulating the control input.

In some embodiments, the penalty function increases monotonically based on the amount by which the constrained variable deviates from a predetermined range. In some embodiments, the extremum-seeking controller is further configured to determine the predetermined range.

In some embodiments, the penalty function is based on a deadband function. The deadband function has a zero value when the constrained variable is between a minimum value of the constrained variable and a maximum value of the constrained variable, decreases linearly when the constrained variable is below the minimum value, and increases linearly when the constrained variable is above the maximum value.

In some embodiments, the extremum-seeking controller is configured to calculate the performance penalty by calculating a value of the deadband function based on the constrained variable to generate a deadband value and calculating a square or absolute value of the deadband value. In some embodiments, the extremum-seeking controller is configured to augment the control input with a dither signal.

Another implementation of the present disclosure is a method. The method includes operating a plant to affect a variable state or condition of a building and providing a control input to the plant and receiving a performance variable as a first feedback from the plant. The plant uses the control input to affect the performance variable. The method also includes receiving a constrained variable as a second feedback from the plant, calculating a performance penalty by applying a penalty function to the constrained variable, modifying the performance variable with the performance penalty to generate a modified cost function, estimating a gradient of the modified cost function with respect to the control input, and driving the gradient of the modified cost function toward zero by modulating the control input.

In some embodiments, the penalty function increases monotonically based on the amount by which the constrained variable deviates from a predetermined range. In some embodiments, the method also includes automatically determining the predetermined range.

In some embodiments, the penalty function is based on a deadband function. The deadband function has a zero value when the constrained variable is between a minimum value of the constrained variable and a maximum value of the constrained variable, decreases linearly when the constrained variable is below the minimum value, and increases linearly when the constrained variable is above the maximum value.

In some embodiments, calculating the performance penalty includes calculating a value of the deadband function based on the constrained variable to generate a deadband value and calculating the square or absolute value of the deadband value. In some embodiments, calculating the performance penalty also includes multiplying the square or absolute value of the deadband by a scaling parameter. In some embodiments, modifying the performance variable with the performance penalty to generate the modified cost function includes multiplying the performance variable by a sum of one and the performance penalty.

In some embodiments, the method also includes augmenting the control input with a dither signal.

Another implementation of the present disclosure is an extremum-seeking controller. The extremum seeking controller includes a constraint hander communicably coupled to a plant to receive a performance variable and a constrained variable. The plant is operable to affect the performance variable and the constrained variable in response to a control input from the extremum-seeking controller. The constraint handler is configured to calculate a performance penalty by applying a penalty function to the constrained variable, modify the performance variable with the performance penalty to generate a modified cost function, and provide the modified cost function to a performance gradient probe. The performance gradient probe is configured to estimate a gradient of the modified cost function with respect to the control input and provide the gradient to a manipulated variable updater. The manipulated variable updater is configured to generate an updated signal for the plant to drive the gradient towards zero.

In some embodiments, the penalty function increases monotonically based on the amount by which the constrained variable deviates from a predetermined range. In some embodiments, the manipulated variable updater is configured to augment the updated control signal with a dither signal. In some embodiments, the constraint handler is configured to modify the performance variable with the penalty function to generate a modified cost function by multiplying the performance variable by a sum of one and the performance penalty.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Building HVAC Systems and Building Management Systems

Figure 1:
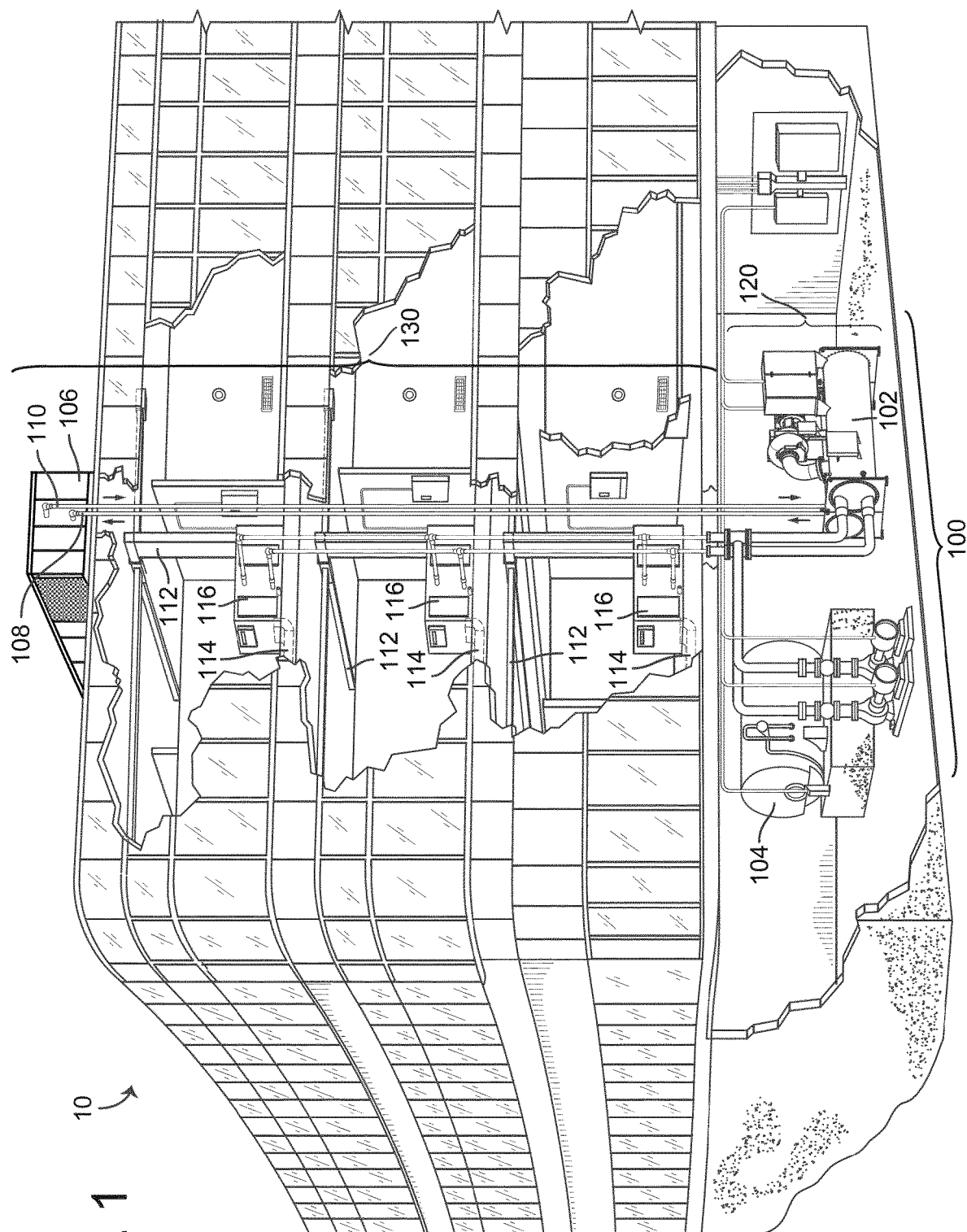
FIG. 1 is a drawing of a building equipped with a HVAC system, according to some embodiments.
Figure 2:
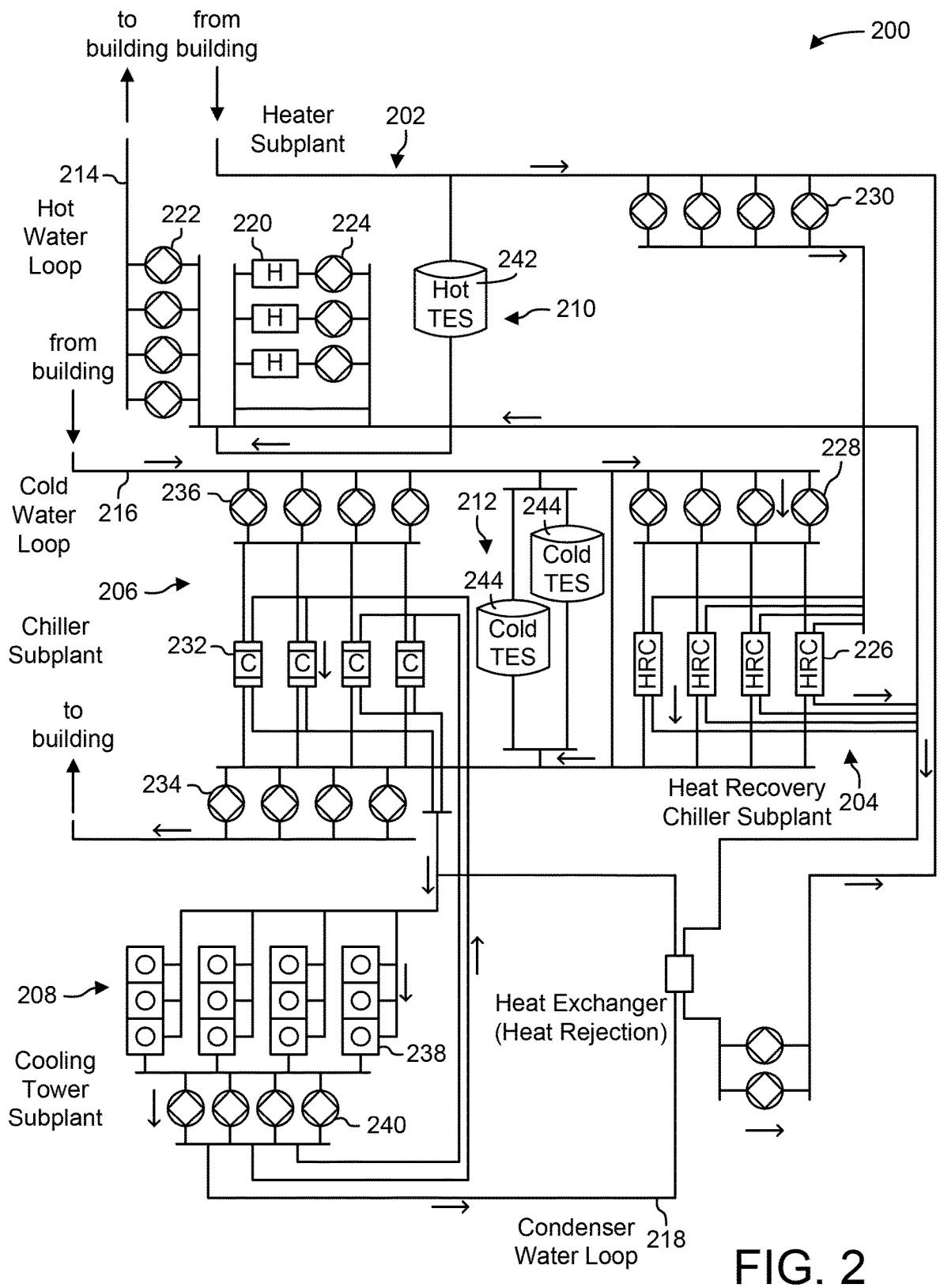
FIG. 2 is a schematic diagram of a waterside system which can be used in conjunction with the building of FIG. 1, according to some embodiments.
Figure 3:
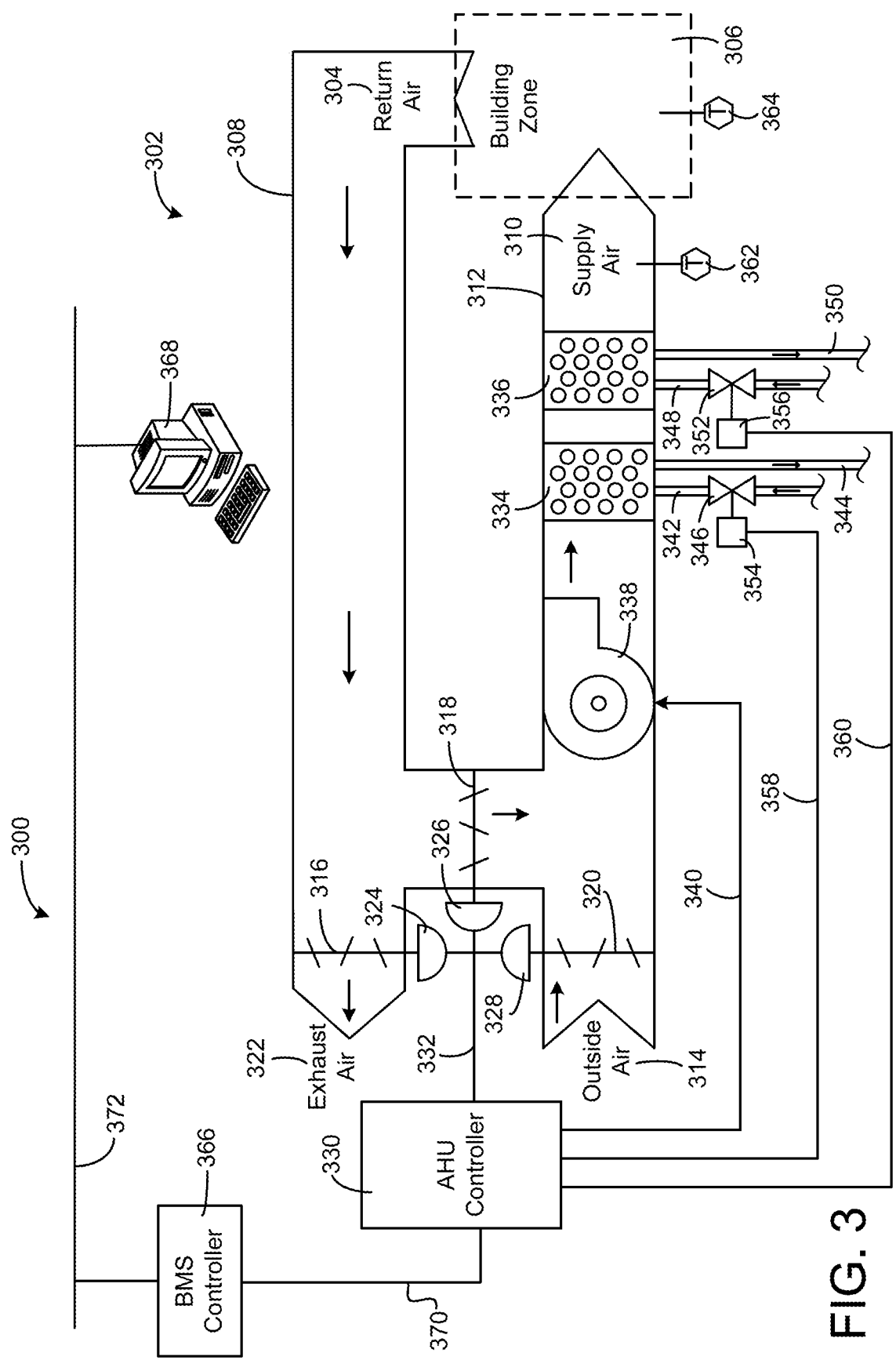
FIG. 3 is a schematic diagram of an airside system which can be used in conjunction with the building of FIG. 1, according to some embodiments.
Figure 4:
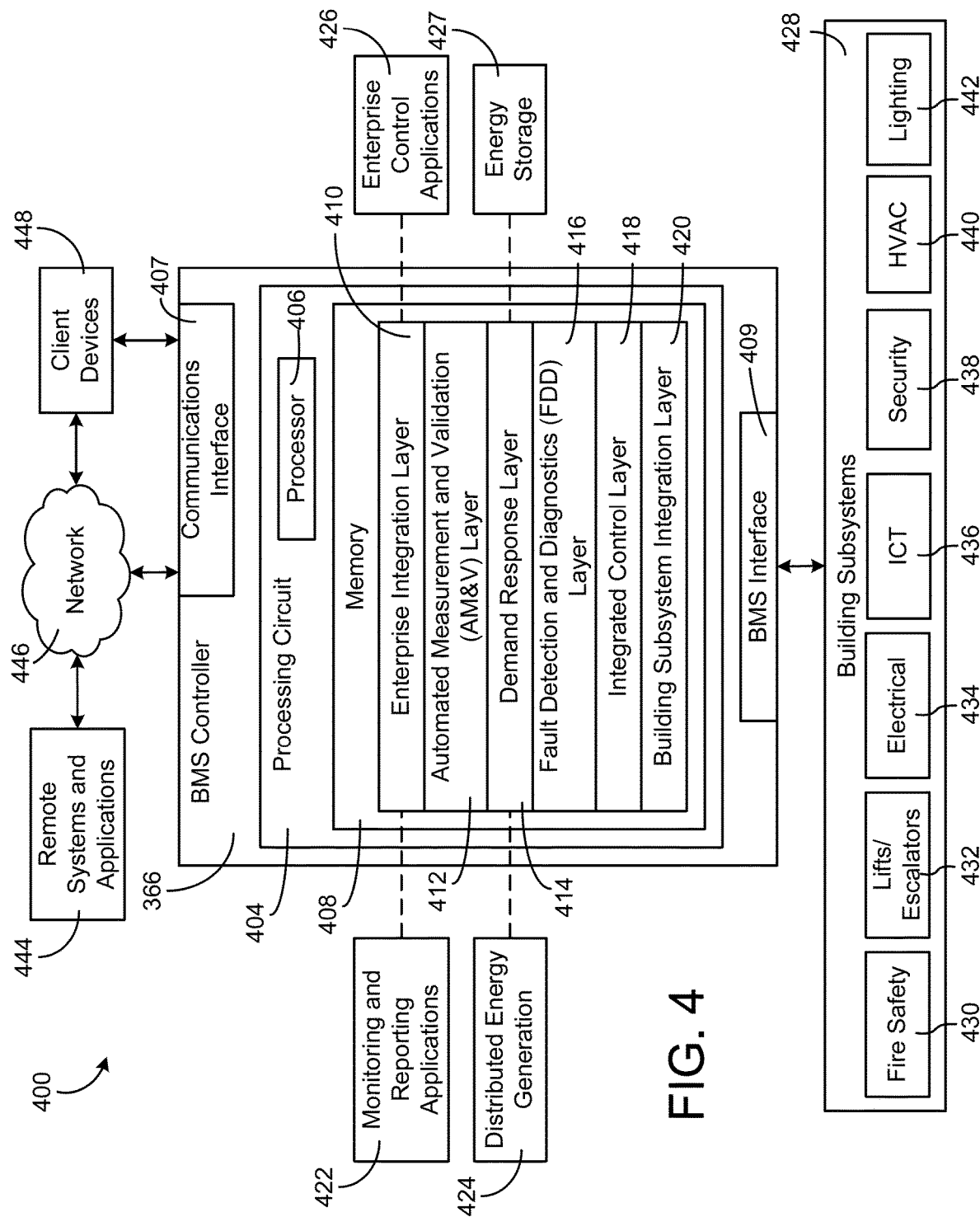
FIG. 4 is a block diagram of a building management system (BMS) which can be used to monitor and control the building of FIG. 1, according to some embodiments.
Figure 5:
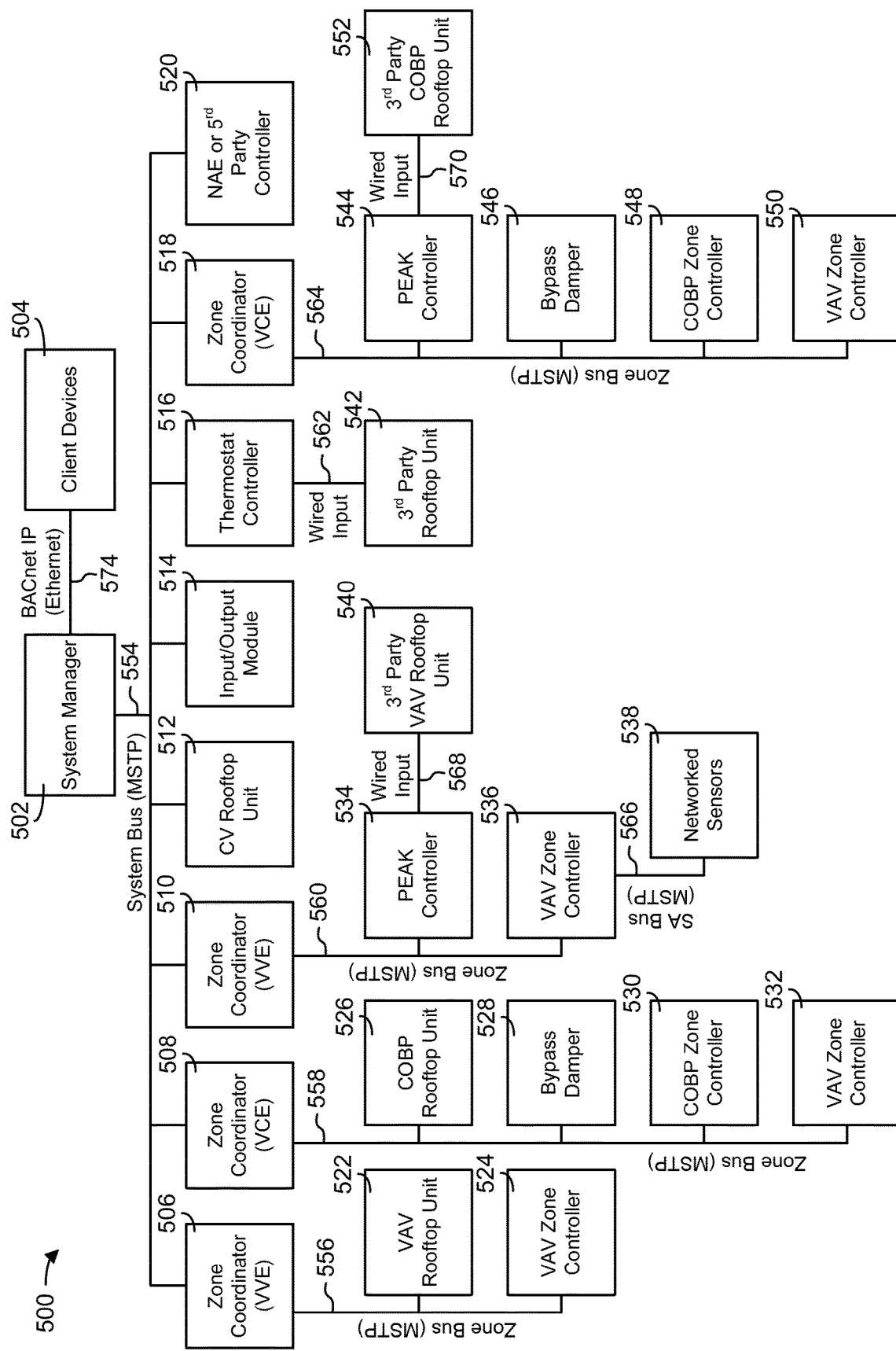
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Extremum-Seeking Control Systems

Figure 6:
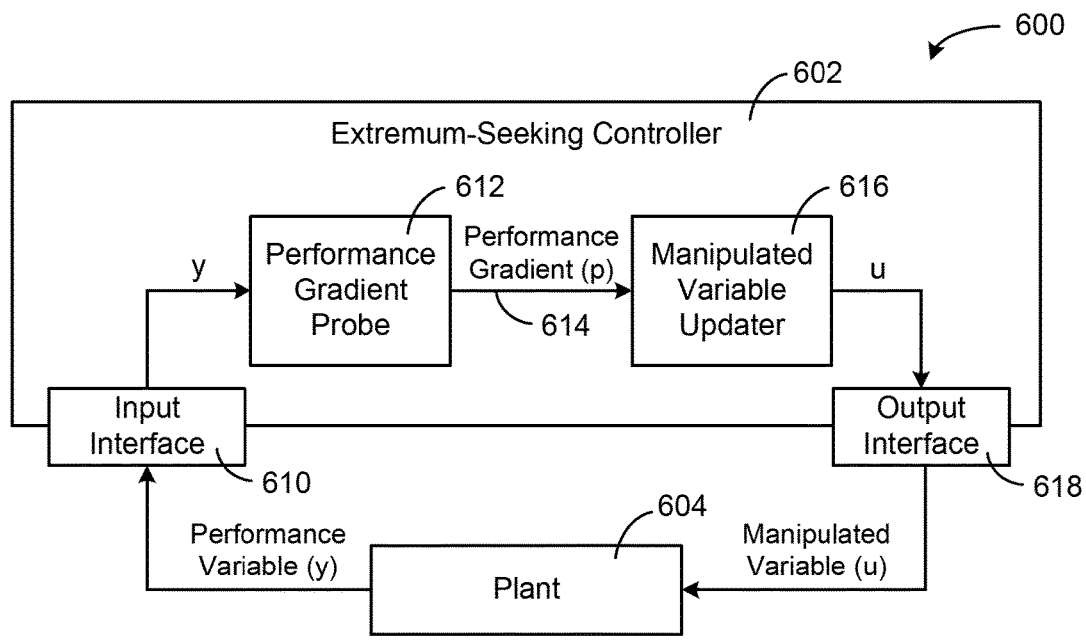
FIG. 6 is a block diagram of an extremum-seeking control (ESC) system which uses a periodic dither signal to perturb a control input provided to a plant, according to some embodiments.

Referring now to FIG. 6, a block diagram of an extremum-seeking control (ESC) system 600 with a periodic dither signal is shown, according to some embodiments. ESC system 600 is shown to include an extremum-seeking controller 602 and a plant 604. A plant in control theory is the combination of a process and one or more mechanically-controlled outputs. For example, plant 604 can be an air handling unit configured to control temperature within a building space via one or more mechanically-controlled actuators and/or dampers. In various embodiments, plant 604 can include a chiller operation process, a damper adjustment process, a mechanical cooling process, a ventilation process, a refrigeration process, or any other process in which an input variable to plant 604 (i.e., manipulated variable u) is adjusted to affect an output from plant 604 (i.e., performance variable y).

Extremum-seeking controller 602 uses extremum-seeking control logic to modulate the manipulated variable u. For example, controller 602 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u. Controller 602 uses extremum-seeking control logic to determine a value for the manipulated variable u that drives the performance gradient p to zero.

Controller 602 may determine the DC value of manipulated variable u based on a measurement or other indication of the performance variable y received as feedback from plant 604 via input interface 610. Measurements from plant 604 can include, but are not limited to, information received from sensors about the state of plant 604 or control signals sent to other devices in the system. In some embodiments, the performance variable y is a measured or observed position of one of valves 354-356. In other embodiments, the performance variable y is a measured or calculated amount of power consumption, a fan speed, a damper position, a temperature, or any other variable that can be measured or calculated by plant 604. Performance variable y can be the variable that extremum-seeking controller 602 seeks to optimize via an extremum-seeking control technique. Performance variable y can be output by plant 604 or observed at plant 604 (e.g., via a sensor) and provided to extremum-seeking controller at input interface 610.

Input interface 610 provides the performance variable y to performance gradient probe 612 to detect the performance gradient 614. Performance gradient 614 may indicate a slope of the function y=$f$ (u), where y represents the performance variable received from plant 604 and u represents the manipulated variable provided to plant 604. When performance gradient 614 is zero, the performance variable y has an extremum value (e.g., a maximum or minimum). Therefore, extremum-seeking controller 602 can optimize the value of the performance variable y by driving performance gradient 614 to zero.

Manipulated variable updater 616 produces an updated manipulated variable u based upon performance gradient 614. In some embodiments, manipulated variable updater 616 includes an integrator to drive performance gradient 614 to zero. Manipulated variable updater 616 then provides an updated manipulated variable u to plant 604 via output interface 618. In some embodiments, manipulated variable u is provided to one of dampers 324-328 (FIG. 2) or an actuator affecting dampers 324-328 as a control signal via output interface 618. Plant 604 can use manipulated variable u as a setpoint to adjust the position of dampers 324-328 and thereby control the relative proportions of outdoor air 314 and return air 304 provided to a temperature-controlled space.

Figure 7:
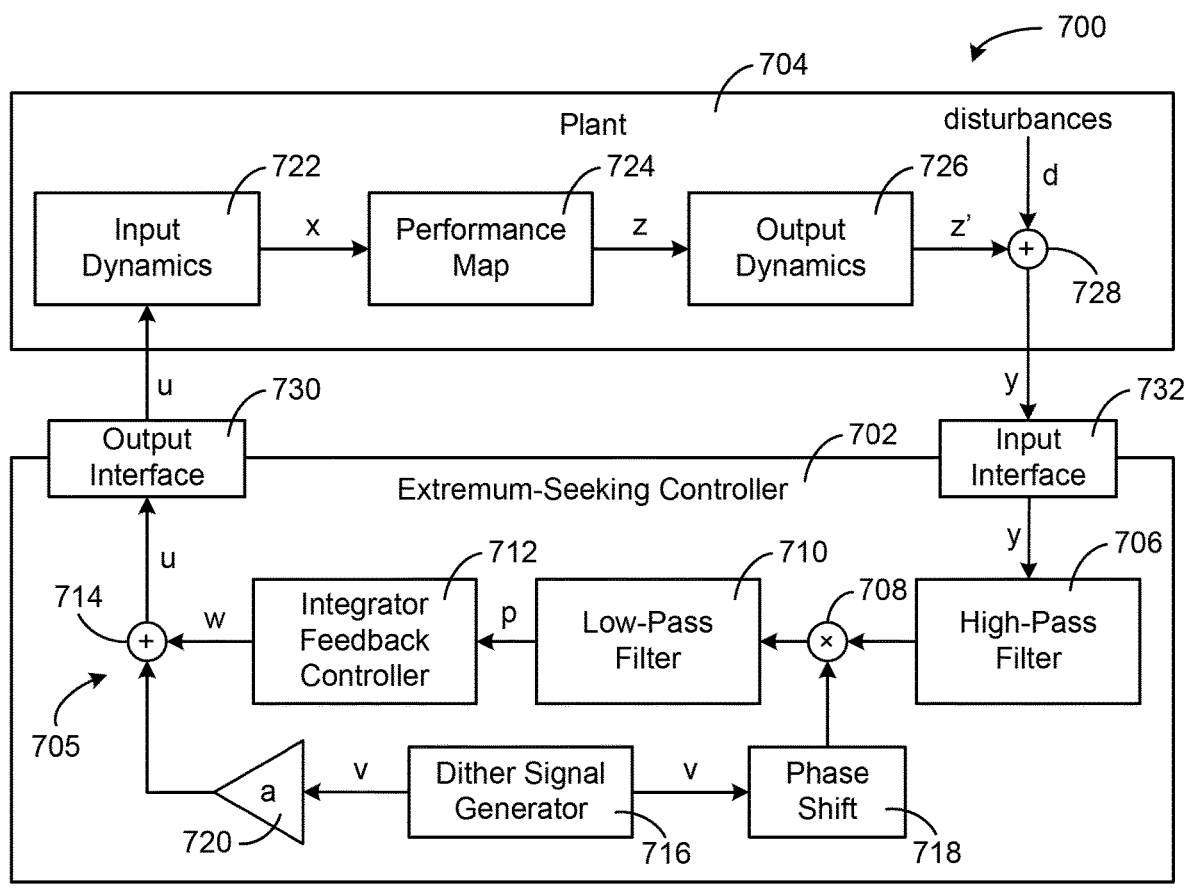
FIG. 7 is a block diagram of another ESC system which uses a periodic dither signal to perturb a control input provided to a plant, according to some embodiments.

Referring now to FIG. 7, a block diagram of another ESC system 700 with a periodic dither signal is shown, according to some embodiments. ESC system 700 is shown to include a plant 704 and an extremum-seeking controller 702. Controller 702 uses an extremum-seeking control strategy to optimize a performance variable y received as an output from plant 704. Optimizing performance variable y can include minimizing y, maximizing y, controlling y to achieve a setpoint, or otherwise regulating the value of performance variable y.

Plant 704 can be the same as plant 604 or similar to plant 604, as described with reference to FIG. 3. For example, plant 704 can be a combination of a process and one or more mechanically-controlled outputs. In some embodiments, plant 704 is an air handling unit configured to control temperature within a building space via one or more mechanically-controlled actuators and/or dampers. In other embodiments, plant 704 can include a chiller operation process, a damper adjustment process, a mechanical cooling process, a ventilation process, or any other process that generates an output based on one or more control inputs.

Plant 704 can be represented mathematically as a combination of input dynamics 722, a performance map 724, output dynamics 726, and disturbances d. In some embodiments, input dynamics 722 are linear time-invariant (LTI) input dynamics and output dynamics 726 are LTI output dynamics. Performance map 724 can be a static nonlinear performance map. Disturbances d can include process noise, measurement noise, or a combination of both. Although the components of plant 704 are shown in FIG. 7, it should be noted that the actual mathematical model for plant 704 does not need to be known in order to apply ESC.

Plant 704 receives a control input u (e.g., a control signal, a manipulated variable, etc.) from extremum-seeking controller 702 via output interface 730. Input dynamics 722 may use the control input u to generate a function signal x based on the control input (e.g., x=$f$(u)). Function signal x may be passed to performance map 724 which generates an output signal z as a function of the function signal (i.e., z=$f$(x)). The output signal z may be passed through output dynamics 726 to produce signal z', which is modified by disturbances d at element 728 to produce performance variable y (e.g., y=z'+d). Performance variable y is provided as an output from plant 704 and received at extremum-seeking controller 702. Extremum-seeking controller 702 may seek to find values for x and/or u that optimize the output z of performance map 724 and/or the performance variable y.

Still referring to FIG. 7, extremum-seeking controller 702 is shown receiving performance variable y via input interface 732 and providing performance variable y to a control loop 705 within controller 702. Control loop 705 is shown to include a high-pass filter 706, a demodulation element 708, a low-pass filter 710, an integrator feedback controller 712, and a dither signal element 714. Control loop 705 may be configured to extract a performance gradient p from performance variable y using a dither-demodulation technique. Integrator feedback controller 712 analyzes the performance gradient p and adjusts the DC value of the plant input (i.e., the variable w) to drive performance gradient p to zero.

The first step of the dither-demodulation technique is performed by dither signal generator 716 and dither signal element 714. Dither signal generator 716 generates a periodic dither signal v, which is typically a sinusoidal signal. Dither signal element 714 receives the dither signal v from dither signal generator 716 and the DC value of the plant input w from controller 712. Dither signal element 714 combines dither signal v with the DC value of the plant input w to generate the perturbed control input u provided to plant 704 (e.g., u=w+v). The perturbed control input u is provided to plant 704 and used by plant 704 to generate performance variable y as previously described.

The second step of the dither-demodulation technique is performed by high-pass filter 706, demodulation element 708, and low-pass filter 710. High-pass filter 706 filters the performance variable y and provides the filtered output to demodulation element 708. Demodulation element 708 demodulates the output of high-pass filter 706 by multiplying the filtered output by the dither signal v with a phase shift 718 applied. The DC value of this multiplication is proportional to the performance gradient p of performance variable y with respect to the control input u. The output of demodulation element 708 is provided to low-pass filter 710, which extracts the performance gradient p (i.e., the DC value of the demodulated output). The estimate of the performance gradient p is then provided to integrator feedback controller 712, which drives the performance gradient estimate p to zero by adjusting the DC value w of the plant input u.

Still referring to FIG. 7, extremum-seeking controller 702 is shown to include an amplifier 720. It may be desirable to amplify the dither signal v such that the amplitude of the dither signal v is large enough for the effects of dither signal v to be evident in the plant output y. The large amplitude of dither signal v can result in large variations in the control input u, even when the DC value w of the control input u remains constant. Due to the periodic nature of the dither signal v, the large variations in the plant input u (i.e., the oscillations caused by the dither signal v) are often noticeable to plant operators.

Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 604 to enhance the effect of the dither signal v on the performance variable y. It can be difficult and challenging to properly select the dither frequency $\omega_v$ without knowledge of the dynamics of plant 704. For these reasons, the use of a periodic dither signal v is one of the drawbacks of traditional ESC.

In ESC system 700, the output of high-pass filter 706 can be represented as the difference between the value of the performance variable y and the expected value of the performance variable y, as shown in the following equation:

Output of High-Pass Filter: $y-E[y]$ where the variable E [y] is the expected value of the performance variable y. The result of the cross-correlation performed by demodulation element 708 (i.e., the output of demodulation element 708) can be represented as the product of the high-pass filter output and the phase-shifted dither signal, as shown in the following equation:

Result of Cross-Correlation: $(y-E[y])(v-E[v])$ where the variable E [v] is the expected value of the dither signal v. The output of low-pass filter 710 can be represented as the covariance of the dither signal v and the performance variable y, as shown in the following equation:

Output of Low-Pass Filter: $E[(y-E[y])(v-E[U])]=Cov(v,y)$ where the variable E [u] is the expected value of the control input u.

The preceding equations show that ESC system 700 generates an estimate for the covariance Cov(v, y) between the dither signal v and the plant output (i.e., the performance variable y). The covariance Cov(v, y) can be used in ESC system 700 as a proxy for the performance gradient p. For example, the covariance Cov(v, y) can be calculated by high-pass filter 706, demodulation element 708, and low-pass filter 710 and provided as a feedback input to integrator feedback controller 712. Integrator feedback controller 712 can adjust the DC value w of the plant input u in order to minimize the covariance Cov(v, y) as part of the feedback control loop.

Extremum-Seeking Control System with Constraint Handling

Figure 8:
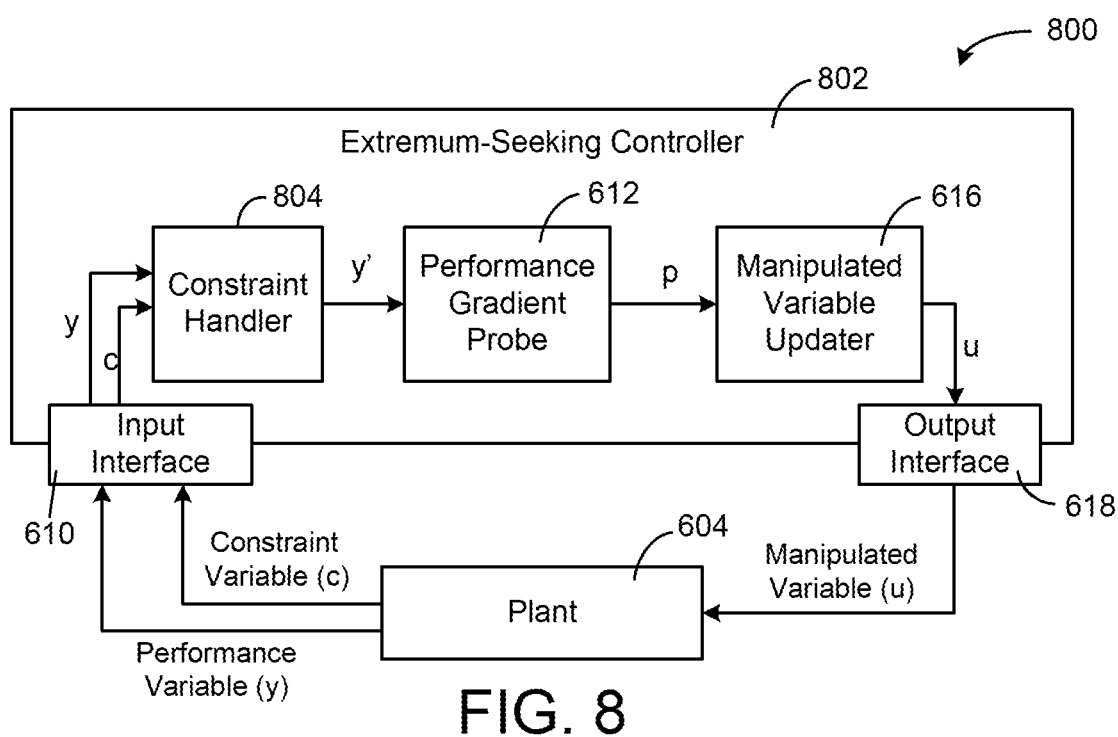
FIG. 8 is a block diagram of an ESC system with a constraint handler, according to some embodiments.

Referring now to FIG. 8, an ESC system 800 with constraint handling is shown, according to some embodiments. ESC system 800 includes extremum-seeking controller 802, which includes the performance gradient probe 612, the manipulated variable updater 616, the input interface 610, and the output interface 618 as for extremum-seeking controller 602 of FIG. 6. However, the extremum-seeking controller 802 of ESC system 800 also includes a constraint handler 804 structured to monitor and impose constraints on a constrained variable affected by the plant 604.

The plant 604 is operable to supply data for a performance variable y and a constrained variable c to the input interface 610 of the extremum-seeking controller 802. The performance variable y is the variable that the ESC system 800 seeks to optimize by finding an extremum of a function $y=f(u)$, where u is an input to the plant 604 and $f$ is a function that defines the dynamic response of the plant 604 to the input u, as described above. The constrained variable c is another output of the plant 604 that can be measured or otherwise provided by the plant 604. The constrained variable c provides a constraint on the optimization of the performance variable y. For example, y may be a power consumption of a heating system for a building, while c may be an indoor air temperature in the building. Extremum-seeking in the power consumption of y without considering the indoor air temperature c may cause the indoor air temperature c to drop below an acceptable level. Therefore, the ESC system 800 uses c to provide a constraint on extremum-seeking for y as described in detail below.

The constraint handler 804 receives the data for the performance variable y and the constrained variable c from the input interface 610. The constraint handler 804 uses y and c to compute a modified cost function y'. More particularly, the constraint handler 804 calculates a modified cost function y' as:

$$y'=y(1+\pi(c)) \qquad \text{Equation 1}$$

where y' is the modified cost function, c is the variable subject to constraint and $\pi(.)$ is a penalty function that increases monotonically according to the extent by which c violates the constraint.

Figure 10:
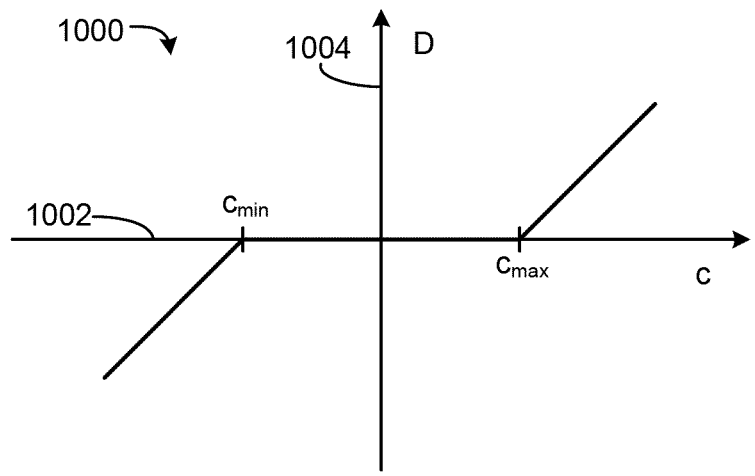
FIG. 10 is a graph of a deadzone for constraint bounds, according to some embodiments.

To calculate $\pi(c)$, the constraint handler 804 implements a simple bounded constraint by utilizing a dead-zone non-linearity d(.). The deadzone function d(.) is illustrated in the graph 1000 of FIG. 10. The constrained variable is denoted on the horizontal axis 1002 by c and the output of the deadzone is denoted by D on the vertical axis 1004. The values $c_{min}$ and $c_{max}$ correspond to the desired lower and upper bounds on the variable c. At values of c between $c_{min}$ and $c_{max}$, the deadzone function d(.) is zero. Outside of the values $c_{min}$ and $c_{max}$, the deadzone function d(.) slopes monotonically away from zero.

The constraint handler 804 calculates a value of the deadzone function d(c), and then removes the sign (i.e., negative direction) by either squaring the output d(c) or by taking the absolute value. The constraint handler 804 then calculates the penalty function $\pi(c)$ as:

$$\pi(u)=\alpha d(c)^2 \qquad \text{Equation 2}$$

where $\alpha$ is a scaling parameter which can be set to a large value to enforce a hard constraint at the bounds or a small value to enforce a soft constraint at the bounds.

The constraint handler 804 thereby calculates the modified cost function $y'=y(1+\pi(c))$. The constraint handler 804 provides the modified cost function y' to the performance gradient probe 612. The performance gradient probe 612 treats y' in a same or similar manner as described above for y with reference to FIG. 6. The performance gradient probe 612 thereby generates the performance gradient p which is used by the manipulated variable updater 616 to generate an updated manipulated variable u to control the plant 604 towards minimizing the performance gradient p of the modified cost function y'.

Figure 9:
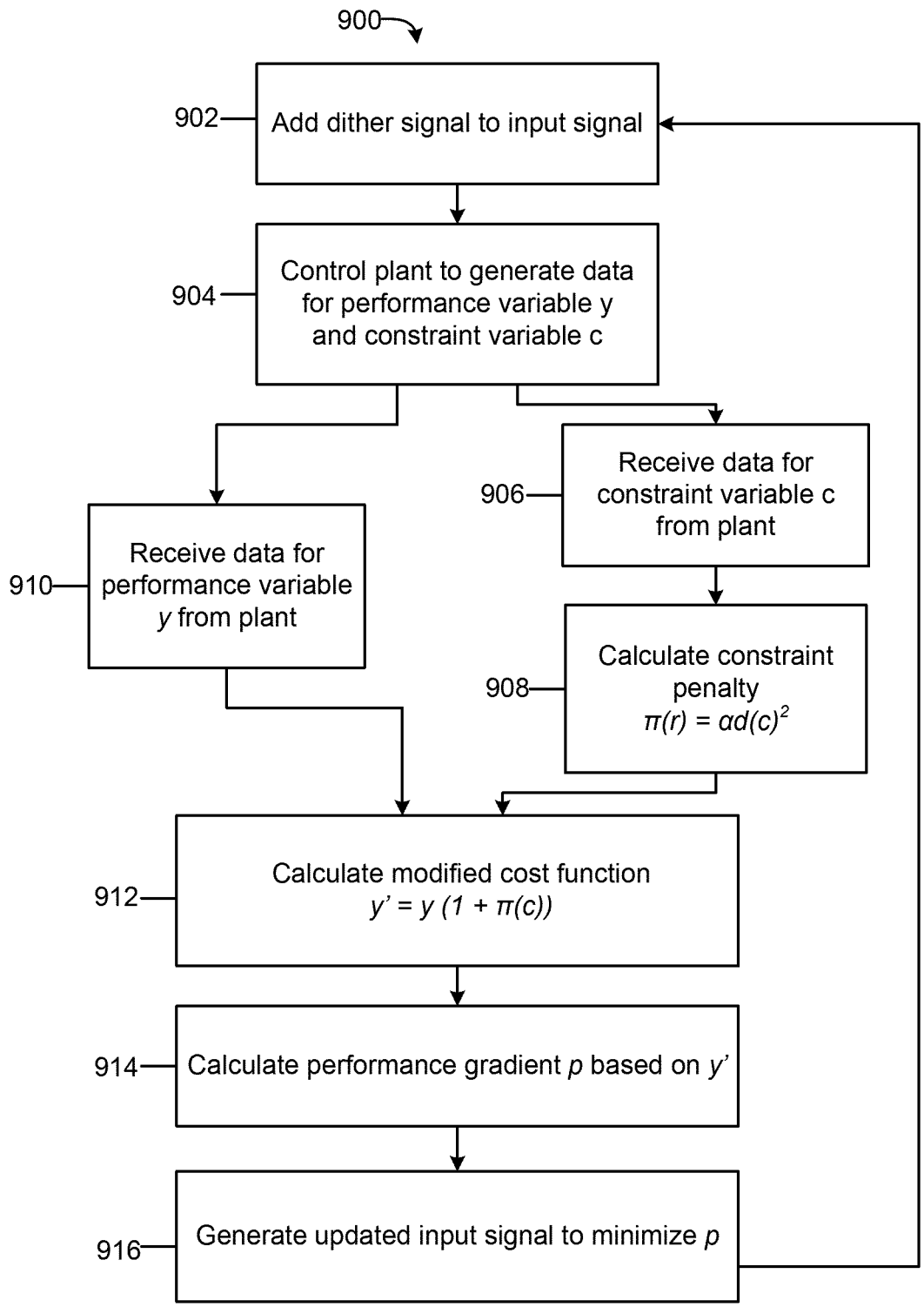
FIG. 9 is a flowchart of a process for handling constraints in ESC, according to some embodiments.

Referring now to FIG. 9, a flow chart of a process 900 for extremum seeking control with constraint handling is shown, according to some embodiments. Process 900 can be carried out by the extremum-seeking controller 802 of FIG. 8. At step 902, the extremum-seeking controller 802 adds a dither signal to an input signal, for example as described above with reference to FIGS. 6-7. At step 904, this combined input is provided to the plant 604 to control the plant 604. The plant 604 operates as controlled to generate data for the performance variable y and the constrained variable c. For example a data sample of y and c may be taken at predetermined intervals.

At step 906, the extremum-seeking controller 802 receives data for the constrained variable c from the plant. That is, the extremum-seeking controller 802 receives a value of c for a particular time step. At step 908, the extremum-seeking controller 802 calculates a constraint penalty $\pi(c)=\alpha d(c)^2$. That is, the extremum-seeking controller 802 determines a value of d(c) using the data received from the plant, squares that value of d(c), and multiples the result by scaling parameter $\alpha$.

At step 910, the extremum-seeking controller 802 receives data for the performance variable y from the plant 604. That is, the extremum-seeking controller 802 receives a value of y for a particular time step. In some cases, the performance variable y is calculated from multiple data points received from the plant 604 (e.g., y is a combined power consumption of two components of the plant 604). At step 912, the extremum-seeking controller 802 calculates the modified cost function $y'=y(1+\pi(c))$ based on the data for the performance variable y and the value of $\pi(c)$ calculated at step 908.

At step 914, the extremum-seeking controller 802 calculates a performance gradient p based on the modified cost function y'. The performance gradient p thus captures the influence of the constraint penalty $\pi(c)$.

At step 916, the extremum-seeking controller 802 generates an updated input signal to minimize the performance gradient p. That is, the extremum-seeking controller 802 generates an updated input signal to reach an extremum of the modified cost function y'. The process 900 then returns to step 902 where the dither signal is added to the input signal. Process 900 may thereby run as a loop to reach and maintain an extremum of the modified cost function y'.

Extremum Seeking Control with Constraint Handling in HVAC System

Figure 11:
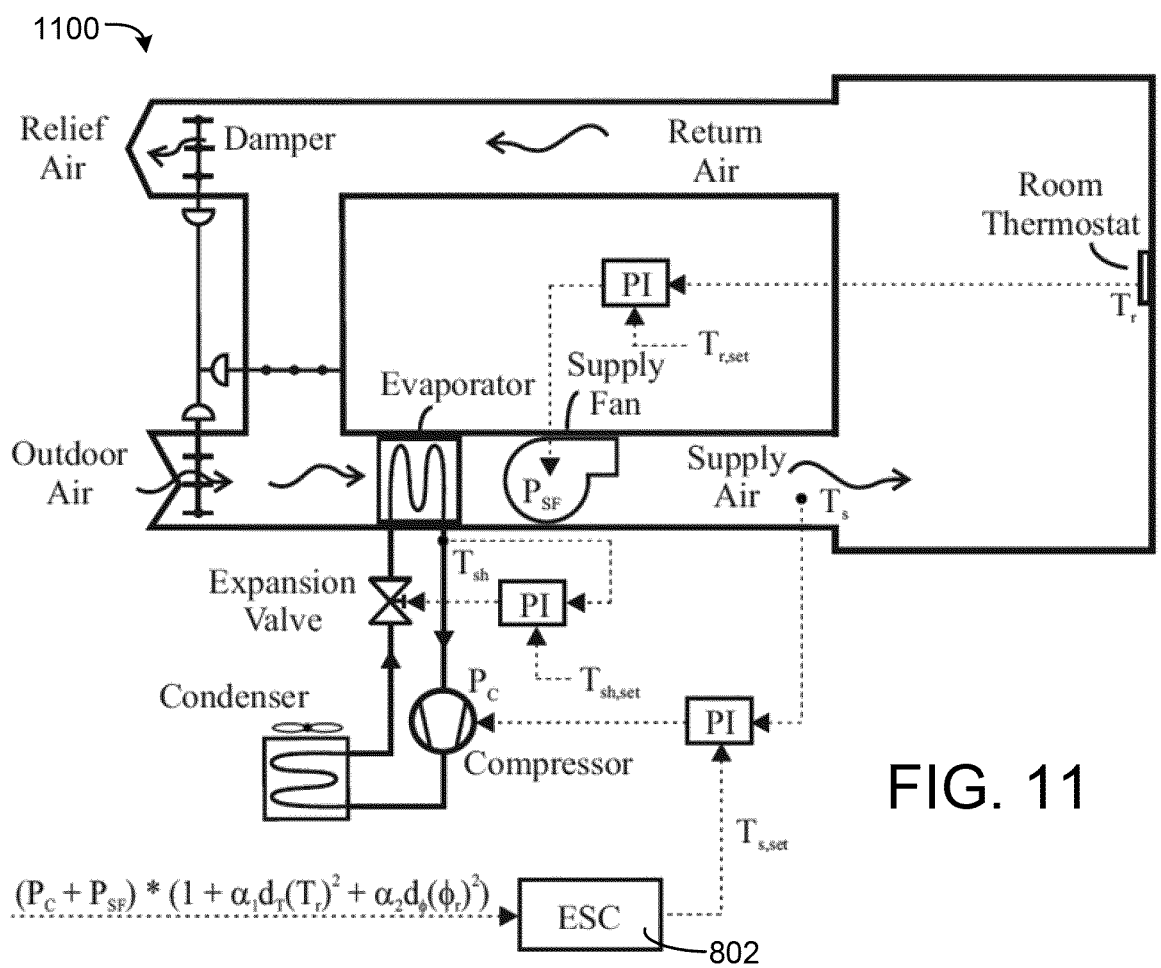
FIG. 11 is a schematic of a simulated rooftop unit cooling a single room, according to some embodiments.

The penalty function approach described above is general in nature and not specific to a particular application. However, this section describes how the method would be applied to one particular problem that is commonly encountered in buildings. ESC is often used to minimize the energy (or power) in an HVAC system, for example the rooftop unit 1100 of FIG. 11. An example of this, depicted in FIG. 11, is to adjust the setpoint for the supply air temperature in a rooftop unit 1100 in order to minimize power by finding the best trade-off between fan power and compressor power. A conventional ESC algorithm locates the optimum setpoint for the supply air temperature in terms of power, but this may lead to a situation where the room controller is unable to meet its temperature or humidity requirements.

To solve the problem described above, the extremum-seeking controller 802, shown in FIG. 11 as communicably coupled to rooftop unit 1100, applies the constraint handling method of FIG. 9 to both temperature $T_r$ and relative humidity $\phi_r$ of the room. The cost function for ESC can be modified as follows:

$$y'=y(1+\alpha_1 d_T(T_r)^2+\alpha_2 d_\phi(\phi)_r)^2)$$ Equation 3 where y is the combined power of the compressor and evaporator fan (the power associated with the condenser fan is not considered in this example) (i.e., $y=P_{compressor}+P_{evaporator\ fan}$), and $d_T(.)$ and $d_\phi(.)$ are the respective deadzones for the temperature and relative humidity. Each of these deadzones have upper and lower bounds that define the narrowness of the constraints. In some embodiments, the constraints are at least wide enough to contain the variations in the variables brought about by the action of the ESC dither on the supply air temperature. In practice, these constraint boundaries could be defined either manually or estimated automatically.

Figure 12:
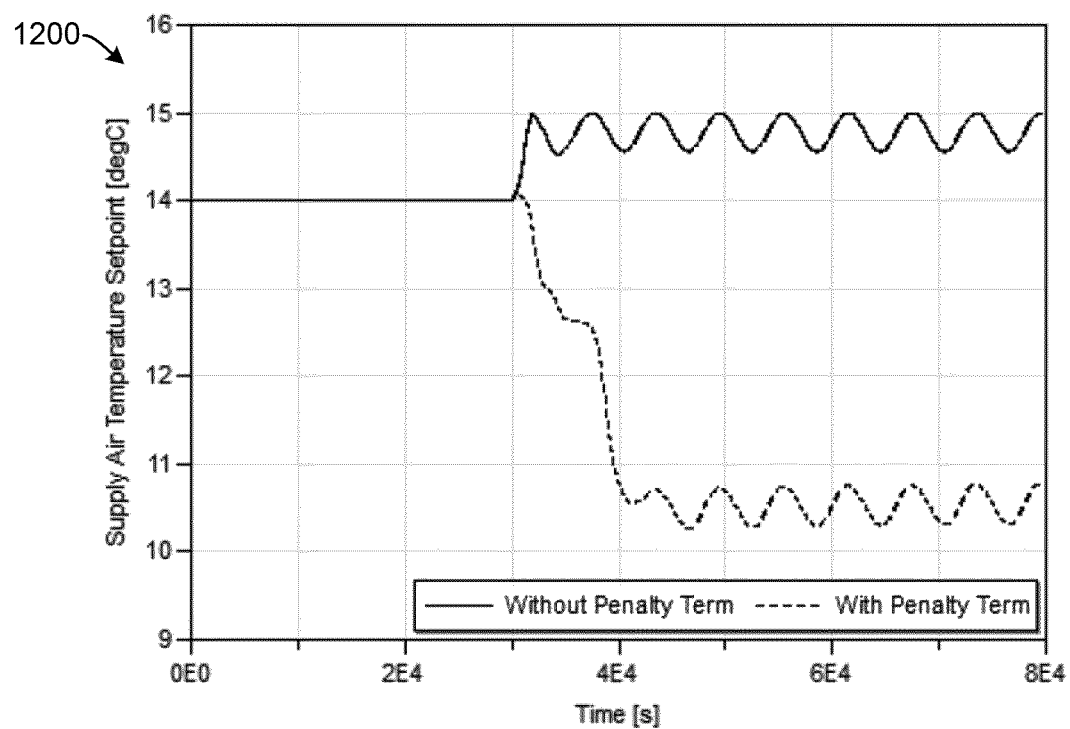
FIG. 12 is a graph of a supply air temperature setpoint without a penalty term and with a penalty term in the ESC algorithm used to control the supply air temperature, according to some embodiments.
Figure 13:
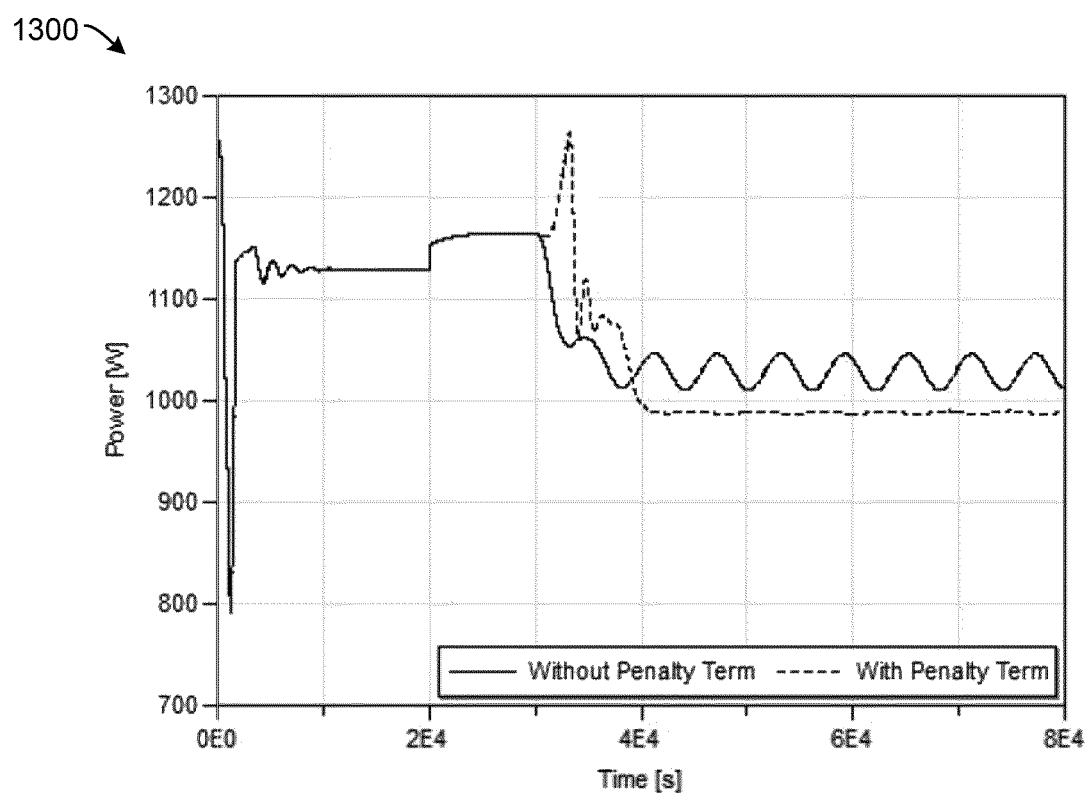
FIG. 13 is a graph of power consumption without a penalty term and with a penalty term in the ESC algorithm, according to some embodiments.
Figure 14:
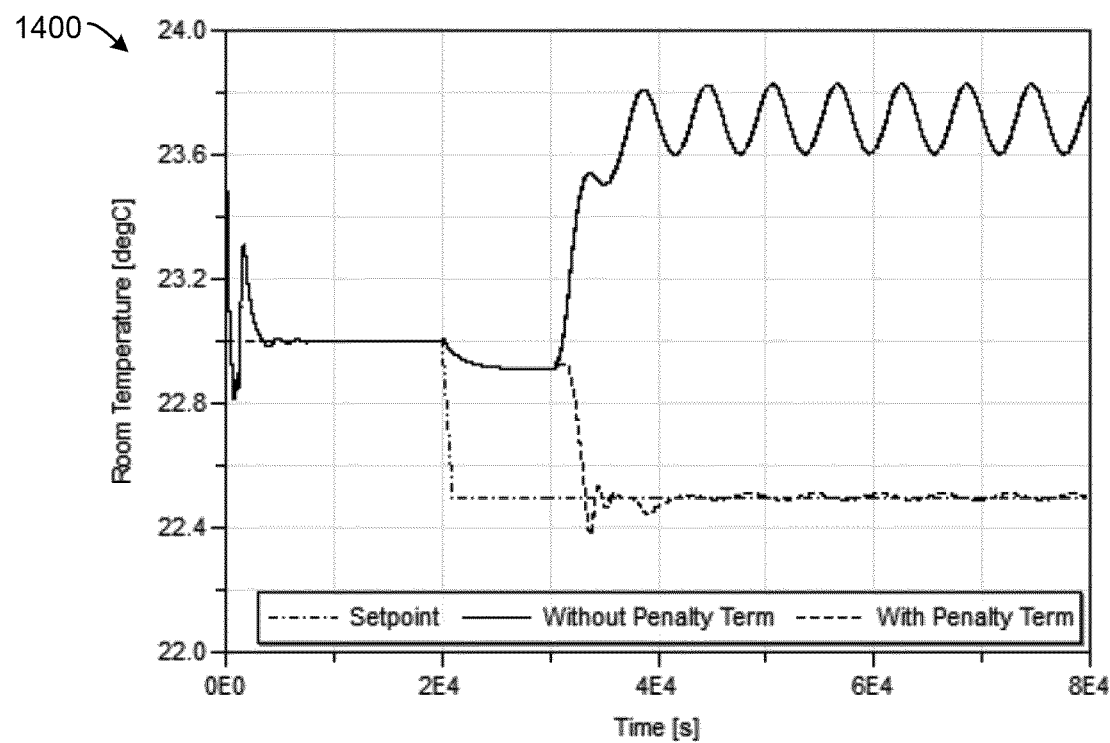
FIG. 14 is a graph of the room air temperature response resulting from the control action illustrated in FIG. 10, according to some embodiments.
Figure 15:
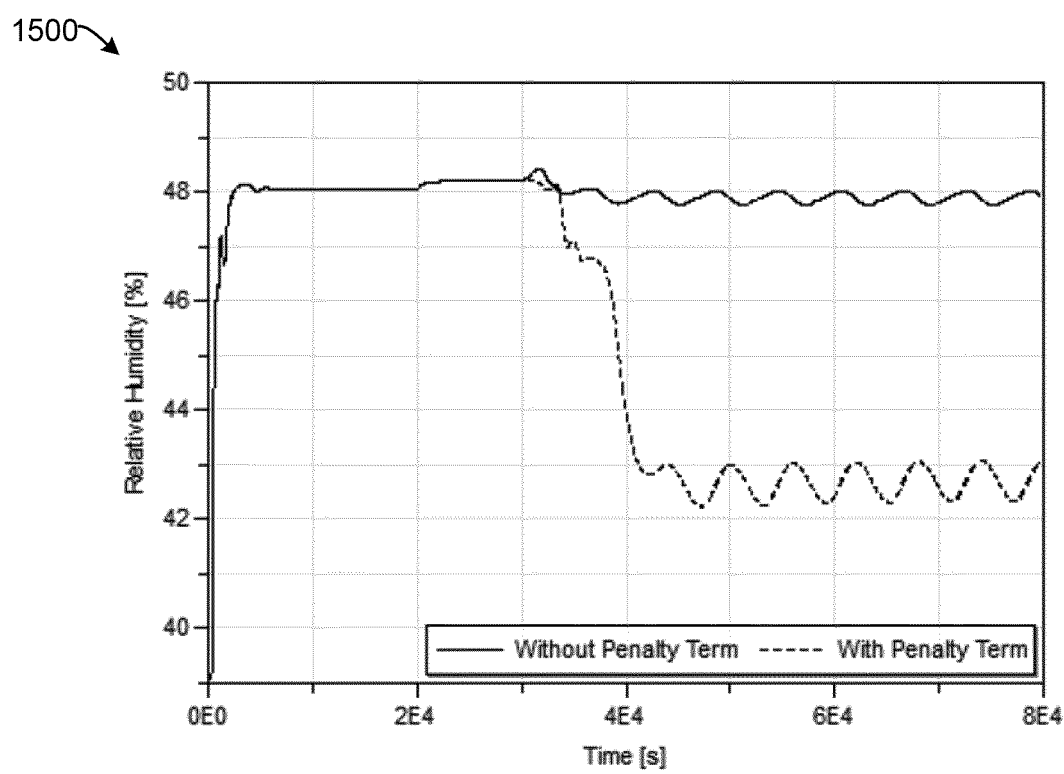
FIG. 15 is a graph of the room air relative humidity response resulting from the control action illustrated in FIG. 10, according to some embodiments.

The effect of the two penalty terms can be seen in FIGS. 12-15, where simulation results for a supply air temperature setpoint, combined power of the compressor and evaporator fan, room air temperature, and room air relative humidity are plotted. The graph 1200 in FIG. 12 plots supply air temperature setpoint versus time. The graph 1300 in FIG. 13 plots power versus time. The graph 1400 in FIG. 14 plots room temperature $T_r$ versus time. The graph 1500 in FIG. 15 plots relative humidity $\phi_r$ versus time.

In the simulations, the room served by the rooftop unit 1100 was subjected to a constant cooling load. The room air temperature setpoint and supply air temperature setpoint were initially 23° C. and 14° C., respectively. Beginning at t=20,000 seconds, the room air temperature setpoint was linearly reduced until its value was 22.5° C. Under these conditions, the rooftop unit 1100 was unable to satisfy the room air temperature setpoint (the supply fan reached its maximum speed, but the room temperature was approximately 22.9° C.). The extremum-seeking controller 802 was then switched on at t=30,000 seconds.

In the first simulation, the penalty terms of Equation 3 were set to zero such that the cost function for ESC only included the combined power of the compressor and evaporator fan. When the extremum-seeking controller 802 was switched on, the extremum-seeking controller 802 determined that power could be minimized by raising the supply air temperature setpoint, thereby reducing compressor power without affecting fan power (since it was already at its maximum value). Thus ESC drove the supply air temperature setpoint to its maximum allowed value of 15° C. and the temperature in the room increased to an average value of approximately 23.7° C. The room air relative humidity was essentially unchanged.

In the second simulation, the penalty terms in Equation 3 were employed using $\alpha_1=1$ and $\alpha_2=1$. The lower and upper bounds of the deadzones for temperature and relative humidity are estimated automatically and vary throughout the simulation. FIG. 12 shows that the penalty terms cause extremum-seeking controller 802 to drive the supply air temperature setpoint to a value of approximately 10.6° C. At this operating point, the combined power of the compressor and evaporator fan is less than it was without the penalty term (see FIG. 11), and the room air temperature reaches its setpoint value of 22.5° C. The lower supply air temperature setpoint also results in a lower room air relative humidity.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An extremum-seeking control system comprising:
a plant operable to affect a variable state or condition of a building;
an extremum-seeking controller configured to:
provide a control input to the plant and receive a performance variable as a first feedback from the plant, wherein the plant uses the control input to affect the performance variable and the performance variable represents a resource consumption of the plant;
receive a measurement of the variable state or condition as a second feedback from the plant;
calculate a performance penalty by applying a penalty function to the measurement, wherein the penalty function is configured such that:
if the measurement is greater than a setpoint or deadzone, the performance penalty increases as the measurement moves away from the setpoint or deadzone; and
if the measurement is less than the setpoint or deadzone, the performance penalty increases as the measurement moves away from the setpoint or deadzone;
modify the performance variable with the performance penalty to generate a modified cost function;
estimate a gradient of the modified cost function with respect to the control input; and
drive the gradient of the modified cost function toward zero by modulating the control input.

2. The extremum-seeking control system of claim 1, wherein the penalty function increases monotonically based on an amount by which the measurement deviates from the deadzone.

3. The extremum-seeking control system of claim 2, wherein modulating the control input comprises applying a dither signal to the control input; and
wherein the extremum-seeking controller is further configured to automatically define a range of the deadzone to contain variations in the measurement caused by the dither signal.

4. The extremum-seeking control system of claim 1, wherein the penalty function is based on a deadzone function, the deadzone function:
having a zero value when the measurement is between a minimum value of the measurement and a maximum value of the measurement;
decreasing linearly when the measurement is below the minimum value; and
increasing linearly when the measurement is above the maximum value.

5. The extremum-seeking control system of claim 4, wherein the extremum-seeking controller is configured to calculate the performance penalty by:
calculating a value of the deadzone function based on the measurement to generate a deadzone value; and
calculating a square or absolute value of the deadzone value.

6. The extremum-seeking control system of claim 5, wherein the extremum-seeking controller is further configured to calculate the performance penalty by multiplying the square or absolute value of the deadzone value by a scaling parameter.

7. The extremum-seeking control system of claim 1, wherein the extremum-seeking controller is configured to modify the performance variable with the performance penalty to generate the modified cost function by multiplying the performance variable by a sum of one and the performance penalty.

8. The extremum-seeking control system of claim 1, wherein the extremum-seeking controller is configured to augment the control input with a dither signal.

9. A method comprising:
operating a plant to affect a variable state or condition of a building;
providing a control input to the plant and receiving a performance variable as a first feedback from the plant, wherein the plant uses the control input to affect the performance variable and the performance variable represents a resource consumption of the plant;
receiving a measurement of the variable state or condition as a second feedback from the plant;
calculating a performance penalty by applying a penalty function to the measurement, wherein the penalty function is configured such that:
if the measurement is greater than a setpoint or deadzone, the performance penalty increases as the measurement moves away from the setpoint or deadzone; and
if the measurement is less than the setpoint or deadzone, the performance penalty increases as the measurement moves away from the setpoint or deadzone;

modifying the performance variable with the performance penalty to generate a modified cost function;

estimating a gradient of the modified cost function with respect to the control input; and driving the gradient of the modified cost function toward zero by modulating the control input.

10. The method of claim 9, wherein the penalty function increases monotonically based on the amount by which the measurement deviates from the deadzone.

11. The method of claim 10, further comprising automatically determining a range of the deadzone by applying a dither signal to the control input and defining the deadzone to contain oscillations in the measurement brought about by action of the dither signal.

12. The method of claim 9, wherein the penalty function is based on a deadzone function, the deadzone function:

having a zero value between when the measurement is between a minimum value and a maximum value;

decreasing linearly when the measurement is below the minimum value; and increasing linearly when the measurement is above the maximum value.

13. The method of claim 12, wherein calculating the performance penalty comprises:

calculating a value of the deadzone function based on the measurement to generate a deadzone value; and calculating a square or absolute value of the deadzone value.

14. The method of claim 13, wherein calculating the performance penalty further comprises multiplying the square or absolute value of the deadzone by a scaling parameter.

15. The method of claim 9, wherein modifying the performance variable with the performance penalty to generate the modified cost function comprises multiplying the performance variable by a sum of one and the performance penalty.

16. The method of claim 9, further comprising augmenting the control input with a dither signal.

17. An extremum-seeking controller, comprising:

a constraint handler communicably coupled to a plant to receive a performance variable and a measurement of a variable state or condition of a building, the plant operable to affect the performance variable and the measurement in response to a control input from the extremum-seeking controller, and the constraint handler configured to:

calculate a performance penalty by applying a penalty function to the measurement, wherein the penalty function is configured such that:

if the measurement is greater than a setpoint or deadzone, the performance penalty increases as the measurement moves away from the setpoint or deadzone; and if the measurement is less than the setpoint or deadzone, the performance penalty increases as the measurement moves away from the setpoint or deadzone;

modify the performance variable with the performance penalty to generate a modified cost function; and provide the modified cost function to a performance gradient probe, the performance gradient probe configured to estimate a gradient of the modified cost function with respect to the control input and provide the gradient to a manipulated variable updater;

wherein the manipulated variable updater is configured to generate an updated control signal for the plant to drive the gradient towards zero.

18. The extremum-seeking controller of claim 17, wherein the penalty function increases monotonically based on the amount by which the measurement deviates from the deadzone.

19. The extremum-seeking controller of claim 17, wherein the manipulated variable updater is configured to augment the updated control signal with a dither signal.

20. The extremum-seeking controller of claim 17, wherein the constraint handler is configured to modify the performance variable with the penalty function to generate the modified cost function by multiplying the performance variable by a sum of one and the performance penalty.

* * * * *